June 18, 1935.  H. A. CENTERVALL  2,004,928
CONTROL MECHANISM FOR HYDRAULIC POWER SYSTEMS
Filed July 25, 1931  2 Sheets-Sheet 1

INVENTOR
Hugo A. Centervall
BY
Robert W. Byerly
ATTORNEY

June 18, 1935.  H. A. CENTERVALL  2,004,928
CONTROL MECHANISM FOR HYDRAULIC POWER SYSTEMS
Filed July 25, 1931  2 Sheets-Sheet 2
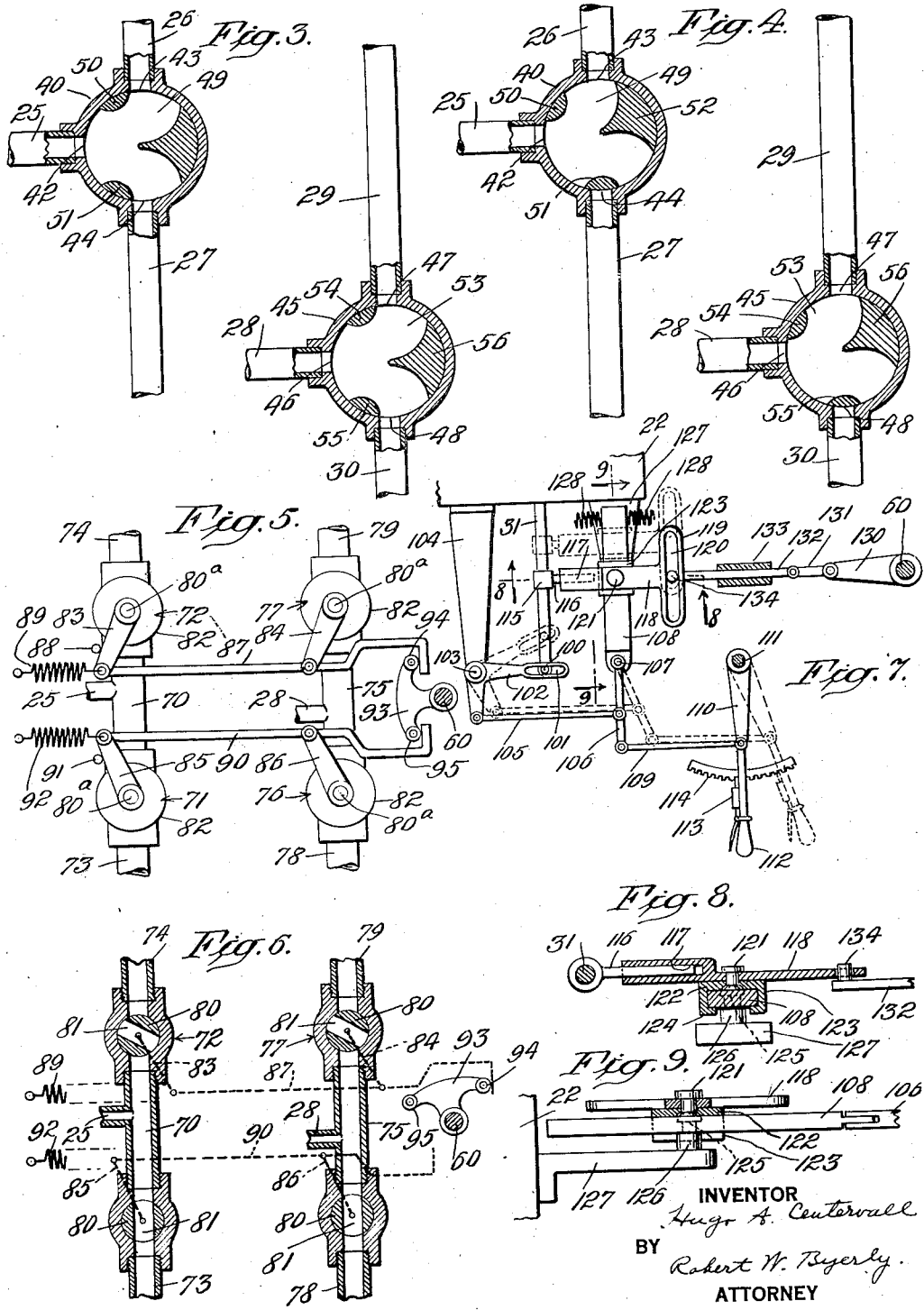

Patented June 18, 1935

2,004,928

UNITED STATES PATENT OFFICE 2,004,928

CONTROL MECHANISM FOR HYDRAULIC POWER SYSTEMS

Hugo A. Centervall, New York, N. Y., assignor to Manly Corporation, New York, N. Y., a corporation of Delaware Application July 25, 1931, Serial No. 553,146

7 Claims. (Cl. 180—9.2)

This invention relates to control mechanism for hydraulic power systems. It relates more particularly to control mechanism for a fluid pressure power transmitting device in which pressure fluid from a common source is used to operate two or more fluid motors whose relative speeds may be varied.

It is suited for use, for example, in connection with automotive vehicles which are propelled by a plurality of hydraulically operated driven members and in which steering of the vehicle is effected by varying the relative speeds of certain of these driven members. One of the commonest of this type of vehicle is the track-type tractor and, for purposes of illustration, I have shown my invention as installed on such a tractor in which power from the driving engine is transmitted to the driven tracks by means of a hydraulic transmission. It will be understood, however, that its use is not limited to this type of tractor nor is its use limited to motor vehicles.

In the past these tractors have been driven by purely mechanical means. They customarily employ a gear box of well-known type so as to permit of changes in speed ratios of the driving engine and the driven or propelling members. As these vehicles move at very low speeds and pull very heavy loads it is not possible to alter the speed ratio while the device is in motion under load, because there is not sufficient momentum to propel the device and its load during the time when the source of power must be disconnected, to shift the gears. The result of this is that such devices must continue to operate in whatever gear ratio they are started and the ability to start a load determines the ratio at which it must be drawn.

Moreover with the usual gear box construction, the number of gear ratios is necessarily limited, the usual practice being to supply three forward speeds and one reverse gear. As the work of these devices varies greatly, due to the variation in loads, variations in soils, etc., it would be highly advantageous to have available a larger number of such ratios so that in each instance the most desirable ratio might be selected for the particular combination of operating conditions encountered.

These limitations of the gear box have necessarily limited the operative efficiencies of these tractors, causing them to frequently operate at slower speeds than would otherwise be the case.

Tractors of the type described herein are ordinarily steered by varying the relative speed of the tracks. This may be accomplished by clutching or breaking mechanism, or both, applied to the driven shaft operating each track, either with or without a differential gear. These clutching and braking mechanisms are large and expensive and are subject to great wear, as they are in almost constant use. They have proved a great source of trouble and have been difficult and expensive to maintain, as well as troublesome to operate.

The hydraulic transmission is ideally suited for application on this type of vehicle, as it offers an infinite number of ratios between driving and driven members, in both forward and reverse speeds, and makes it possible to eliminate the troublesome steering brakes and clutches. Heretofore, hydraulic transmission devices have been designed for this purpose, but all of them, so far as I am aware, have embodied two complete hydraulic transmissions or their equivalent, which has added greatly to the cost and to the complications of such apparatus.

An object of my invention is to provide a simple and inexpensive device consisting of only one main fluid circulatory system.

A further object is to provide a hydraulic transmission employing only one variable stroke pump or its equivalent with a plurality of hydraulic motors. Other objects will appear from the description and the appended claims.

An advantage of my device is that it permits steering to be effected with little or no manual exertion on the part of the operator.

A further advantage is that it makes it possible for the speed of the outer track or wheel to be maintained substantially the same on a turn as when the device is moving straight ahead.

Before explaining in detail the present invention, it is to be understood that the invention is not limited in its application to the details of construction and arrangement of parts illustrated in the accompanying drawings, since the invention is capable of other embodiments and of being practiced and carried out in various ways. It is also to be understood that the phraseology or terminology reported herein, is for the purpose of description and not for limitation, and it is not intended to limit the invention beyond the terms of the several claims hereto appended as considered in view of the prior art and the requirements thereof.

In the drawings:—

Fig. 3 is an enlarged horizontal cross-sectional view through the valve device utilized in the form shown in Fig. 1.

Fig. 4 is a view similar to that in Fig. 3, but showing the valve device in a different position of adjustment.

Fig. 5 is an enlarged top plan view of the valve mechanism employed on the form of my invention shown in Fig. 2.

Fig. 6 is a horizontal cross-section through Fig. 5.

Fig. 7 is an enlarged top plan view of the pump controlling mechanism.

Fig. 8 is an enlarged sectional view taken on the line 8—8 in Fig. 7.

Fig. 9 is an enlarged sectional view taken on the line 9—9 in Fig. 7.

Figure 1:
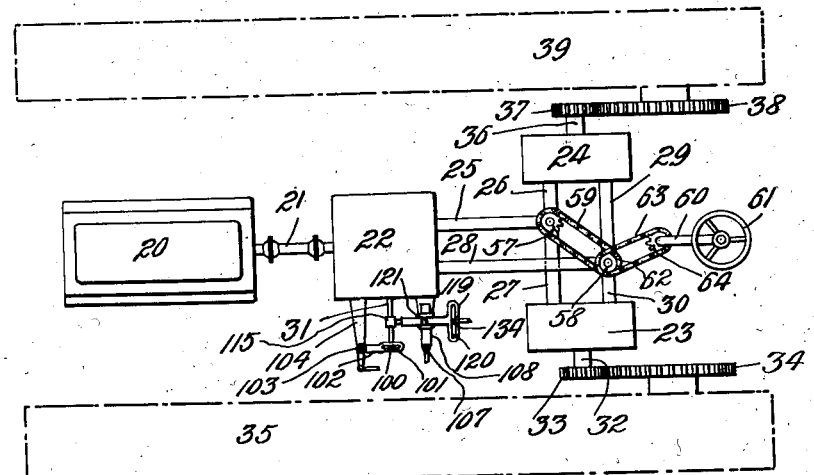
Fig. 1 is a top plan view of a track-type tractor embodying one form of my invention, shown partly schematically.
Figure 2:
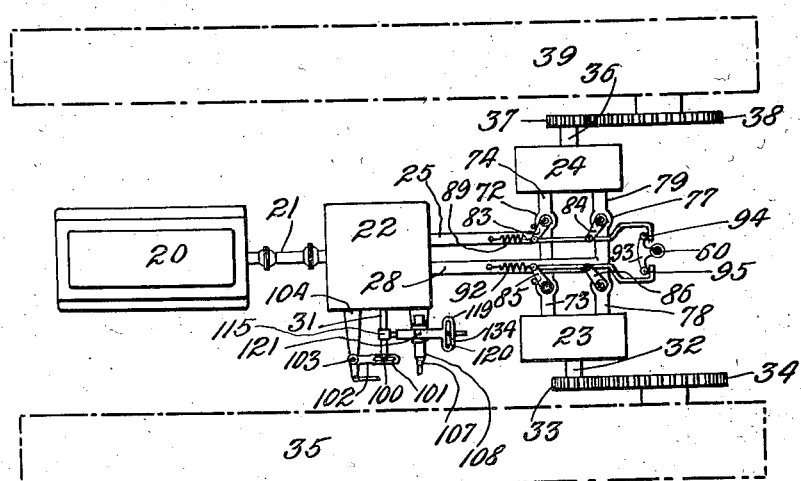
Fig. 2 is a top plan view of a track-type tractor embodying an alternative form of this invention, shown partly schematically.

The numeral 20, Figs. 1 and 2, designates a source of power of any suitable kind, for example, an internal combustion gasoline engine, which drives the variable stroke hydraulic pump 22 through suitable shaft connections 21. The pump 22 supplies fluid under pressure to the hydraulic motors 23, 24, to which it is operatively connected through a closed fluid circuit comprising pipes 25, 26 and 27 and pipes 28 and 29 and 30. Pipes 25 and 28, each communicate equally with the motors 23 and 24 by means of pipes 26 and 27, and 29 and 30, respectively. The engine 20, the pump 22 and the motors 23, 24 are suitably supported upon the frame of the tractor (not shown). The pump 22 and the motors 23, 24 form no part of this invention. They may be of any preferred type, as for example those shown in my co-pending application filed July 11, 1931 and given Serial No. 550,198.

The quantity of fluid discharged by the pump 22 may be caused to vary from zero to maximum and may be caused to flow in either direction in its closed fluid circuit. The motors 23, 24 are equal in size and are of fixed stroke so that their speed will vary directly in proportion to the quantity of fluid supplied by the pump 22. By regulation of the stroke of the pump 22, therefore, the speed of the motors may be made to vary from zero to maximum in either forward or reverse speeds in a manner well known to those skilled in the art. For controlling the stroke of the pump I have indicated the rod 31. Movement of the rod from its middle position will cause stroke to be given to the pump, the direction of flow within the fluid circuit depending on the direction of movement of the rod 31. In turn the direction of flow of the fluid will, of course, determine the direction of rotation of the shafts of the motors 23 and 24.

Operatively connected to the motor 23 is the driven shaft 32 upon which is suitably secured a gear 33 meshing with a larger gear 34. The gear 34 is rotatably mounted upon the frame of the tractor (not shown) and is operatively connected with whatever mechanism is employed to drive the track 35. Similarly the motor 24 has a driven shaft 36 upon which is mounted a gear 37 meshing with a larger gear 38, which is operatively connected with whatever means are employed to drive the track 39.

Located at the union of the pipes 25, 26 and 27 is a valve chamber 40, Figs. 3 and 4, having ports 42, 43 and 44 with which the pipes 25, 26 and 27 are connected and through which passes all fluid going into or out of said pipes. Similarly, at the union of the pipes 28, 29 and 30 is a valve chamber 45 having ports 46, 47 and 48 connected to said pipes 28, 29 and 30 respectively.

Within the valve chamber 40 is a rotatable plug 49, formed with a solid circular portion and having the three lobes 50, 51 and 52 extending up therefrom. Within the chamber 45 is a valve plug 53 similarly constructed and having corresponding lobes 54, 55 and 56. Chambers 40 and 45 are closed by suitable covers.

The rotation of the plugs 49 and 53 may be effected in any suitable way. In the preferred embodiment, I employ sprockets 57 and 58, see Fig. 1, rigidly fixed on the upstanding stems of the valve plugs 49 and 53. Trained about these sprockets is a chain 59. Positioned above the sprocket 58 is a second sprocket 62 mounted on the stem of the plug 53.

Rotatably mounted on suitable supports upon the frame of the tractor, (not shown) is a steering post 60 on the upper end of which is mounted a steering wheel 61 by which the post may be turned. Fastened upon the lower end of the post 60 is a sprocket 64. Trained about the sprockets 62 and 64 is a chain 63.

As here shown, the sprockets 64 and 62 are of equal size, but they may be of different sizes if preferred.

When the engine 20 is started it turns with it the pump 22. As long as the pump is in the no stroke position, no fluid will be pumped and the tractor will remain stationary. As soon as stroke is given to the pump 22, fluid will be discharged under pressure through the pipe 25, into the valve chamber 40. With the plugs 49 and 53 in the position shown in Fig. 3 substantially equal resistance will be offered to the fluid at ports 43 and 44 and a substantially equal volume of fluid will be delivered to each of the motors 23 and 24, thereby actuating them. As the motors are of equal size and as they are receiving substantially equal quantities of fluid, the speeds of their driven shafts will be equal. Hence, through the gears 33 and 34 and 37 and 48, respectively, the tracks 35 and 39 will be driven at equal speeds and the tractor will move in a straight path.

Fluid exhausted by the motors 23 and 24 will return to the pump 22 through the connecting pipes 29 and 30, the valve chamber 45 and the pipe 28.

If it is desired to turn the tractor toward the track 35, the operator turns the steering wheel 61 in a counter clockwise direction. The wheel turns with it the post 60, the sprocket 64, the chain 63, the sprocket 62 and the valve plug 53. The sprocket 58 on the stem of the plug 53 is also turned and through the chain 59 turns the sprocket 57 and the valve plug 49. The plugs 49 and 53 are thus synchronously turned in a counter clockwise direction and as they turn, the lobes 51 and 55 begin to cover the ports 44 and 48 respectively, continuing to do so until the ports 44 and 48 are completely covered. As the lobes begin to cover the ports they set up resistance to flow in either direction, this resistance increasing as the ports become more and more covered. Due this resistance, the fluid entering the chamber 40 will be divided into unequal quantities, the smaller quantity going through the pipe 27 to the motor 23, causing its speed to be decreased. The larger quantity will go through the pipe 26 to the motor 24, whose speed will thereby be proportionately increased. The track 39 will therefore be driven more rapidly than the track 35, so that the tractor will turn in the direction of the latter track.

If it is desired to turn the tractor in the other direction, the operator turns the wheel 61 in a clockwise direction, and the rotation of the plugs is reversed, causing the lobes 50 and 54 to close or partially close the ports 43 and 47, and thus causing the tractor to turn toward the track 39.

While it has here been assumed, for simplicity, that the pressure fluid is being delivered by the pump 22 to the pipe 25, the device functions in the same manner if the pressure fluid be delivered to the pipe 28.

The lobes 52 and 56 perform no throttling function, but are employed to give strength to the structure. I prefer to shape them as shown so as to utilize their curved surfaces to reduce resistance to flow in the chambers.

An alternative embodiment of my invention is shown in Figs. 2, 5 and 6. The pipe 25 is connected with a transverse pipe 70 at each end of which are valve chambers 71 and 72. The pipe 73 leads from the chamber 71 to the motor 23 and the pipe 74 leads from the chamber 72 to the motor 24. The pipe 28 is similarly connected to the motors 23 and 24 through the transverse pipe 75, the valve chambers 76 and 77 and the pipes 78 and 79.

Rotatably fitted within each of the valve chambers 71, 72, 76 and 77 are valve plugs 80, each of which is provided with an upwardly projecting stem 80a. These plugs as shown are of circular cross-section and are provided with transverse passages 81, Fig. 6, preferably of the same diameter as the pipes connected to the valve chambers. The valve chambers are closed by suitably secured covers 82, provided with apertures through which project the stems 80a of the plugs and rigidly attached to the stems are operating levers 83, 84, 85 and 86 respectively. The levers 83 and 84 are each connected to the rod 87, which, near one end, is offset outwardly, the extreme end of the rod being bent at substantially right angles. The lever 83 is yieldingly held against the stop 88 by a spring 89 fastened at its other end to the pipe 25 or any other suitable support. The stop 88, the levers 83 and 84 and the rod 87 are so positioned and proportioned that when the parts are in the positions shown in Fig. 5 the transverse passages 81 in the chambers 72 and 77 are in line with the bores of the pipe 70 and 74 and 75 and 79 respectively. Similarly the levers 85 and 86 are movably connected to their corresponding rod 90, the lever 85 being yieldingly held against its stop 91 by the spring 92, here shown with its other end fastened to the pipe 28.

Attached to the steering post 60 is a double lever member 93 of such size and shape that the rollers 94 and 95 on its free ends bear lightly against the angled ends of the rods 87 and 90, when the latter are in the positions determined by the stops 88 and 91.

With the parts in the positions shown in Fig. 5 the transverse passages 81 in all the plugs 80 are in line with the bores of the transverse pipes 70 and 75. Pressure fluid delivered through either pipes 25 or 28 will meet substantially equal resistance in both directions and will divide into substantially equal quantities going to the motors 23 and 24. The driven shafts of these motors and hence the tracks 35 and 39 will be driven at equal speeds and the tractor will travel in a straight path. If it is desired to turn towards the track 39, the operator turns the steering wheel 61 and the post 60 in a clockwise direction, thereby rotating the member 93 and causing it, through the roller 94, to contact with the angled end of the rod 87 and move it forwardly. The levers 83 and 84 will be moved to the right, as shown in Fig. 6, throttling the flow of fluid to and from the motor 24 and hence decreasing its speed and the speed of the track 39. This will cause more fluid to be delivered to the motor 23, which will increase its speed and the speed of the track 35. This change in the relative speed of the tracks will cause the tractor to turn towards track 39.

To turn the tractor towards track 35, the operator turns the wheel 61 in a counter clockwise direction and the rod 90, the levers 85 and 86 and the plugs 80 in the chambers 71 and 76 are moved so as to throttle the flow of fluid to and from the motor 23, causing this motor and its track 35 to be slowed down and the motor 24 and the track 39 to be speeded up. The degree of throttling may be varied progressively from wide open position to a position where the plugs 81 have completely cut off communication between the valve chambers and the connected transverse pipes leading to the motor. Fig. 6 shows the plugs 80 in the chambers 72 and 77 in the closed position and the dotted lines indicate the positions of the levers 83 and 84 and of the rod 87. As is also shown by the dotted lines in this Fig. 6, the roller 95 swings clear of the angled end of the rod 90.

In both embodiments of my invention described above, the operator is able to turn the tractor, when travelling forward or in reverse, by simply turning the steering wheel in the direction in which he desires to go and the only effort required of the operator is the small amount necessary to turn the valve plugs and to move the mechanism operating them.

My invention makes it possible to turn the tractor as gradually or as sharply as desired, depending on the degree to which the steering wheel is turned. In either of the embodiments described herein, as shown in Figs. 4 and 6, communication with one or the other of motors 23 or 24 may be completely cut off and the fluid in the motor effectively locked in place so that it cannot operate and will act as a brake, causing its corresponding track to come to a stop and causing the tractor to pivot about. In both embodiments, all parts return to their neutral position when the steering wheel is turned back to its neutral position. Either of these embodiments may be employed with or without the stroke reducing mechanism.

In some installations it may be desirable, when making a turn, not to speed up the outside track proportionately as the speed of the inside track is decreased. I therefore provide a mechanism, Figs. 7, 8 and 9, for regulating the pump 22 to accomplish this result. This mechanism, if desired, may be used with either of the embodiments of my invention already described.

As shown in Fig. 1, the end of the adjusting rod 31 is formed with a pin 100 slidably fitting within a slot 101 on one arm of a bell crank 102, which is pivoted as at 103 upon a supporting bracket 104. Movably joined to the other arm of the bellcrank is a rod 105 whose other end is movably connected to a lever 106 intermediate its ends. One end of the lever 106 is fulcrumed as at 107 upon the end of a lever 108, to be described. The opposite end of lever 106 is movably fastened to one end of a floating link 109, the other end of which is movably attached to an intermediate point on the control lever 110. The control lever 110 is pivotally mounted at 111 and has a handle portion 112 which may be provided with a ratchet 113 cooperating with a rack 114 or other suitable means, to hold the control lever in any position for which it is set.

Extending at substantially right angles to the rod 31 and fastened intermediate its ends as at 115 is a guide 116 which is fitted into a grooved guide 117 formed in one end of the member 118. Formed on the other end of the member 118 is a cross head 119 having a slot 120 at substantially right angles to the grooved guide 117 on its other end. The member 118 is pivoted intermediate its ends, as at 121, upon the top of a slide 122. The lower part of the slide 122 is provided with a transverse guideway comprising depending parallel side walls 123 and the inwardly extending flanges 124. This guideway is made of such size and shape as to permit the slide 122 to be moved along the lever 108 upon which it is mounted. The lever 108 is pivoted, adjacent its center, as at 125, upon the stud 126 on the supporting bracket 127, which may be attached to the pump 22 or otherwise suitably secured and is yieldingly held in place by springs 128.

Attached to the steering post 60 is a lever 130 whose other end is movably connected to one end of a link 131, the other end of said link being movably connected to one end of a rod 132. The rod 131 passes through a guide 133 and its other end is formed with a pin 134 slidably fitting within the slot 120 in the cross head 119 on the member 118.

The length and the direction of the stroke of the pump 22, which respectively determine the speed, and the direction of travel, of the tractor, are determined by the position of the adjusting rod 31. The operator sets this for any desired amount, either forward or reverse, by releasing the ratchet 113 and moving the handle 112 of the control rod 110. The control rod swings on its pivot 111, moves with it the lever 109, which in turn rotates the lever 106 about its pivot 107. The lever 105 is thereby actuated and causes the bell crank 102 to swing on its pivot 103. Since the pin 100 in the arm 31 is engaged by the slot 101, the movement of the bell crank actuates the arm 31 thereby varying the stroke of the pump.

The full lines in Fig. 7 illustrate the position of the parts at the no stroke position of the rod 31. As the rod 31 is moved, the guide 116 carries with it the member 118, the slide 122 slipping along upon the lever 108. The slot 120 in the cross head 119 is thus maintained parallel to the rod 31 at all points of the latter's adjustment.

In the operation of the device, when the operator turns the steering wheel 61 in either direction the lever 130 upon the post 60 is also turned, carrying with it the link 131 and the rod 132. The rod 132 is prevented from swinging by the guide 133 and therefore the pin 134 on the end of rod 132 exerts a pulling effect on the cross head 119 and the member 118 which is prevented from turning by the spline 116 in the grooved guide 117. This pulling effort is transmitted through the slide 122 and causes the lever 108 to turn on its pivot 125. As the lever 108 swings it carries with it one end of the lever 106. The rod 105 is therefore moved by the lever 106 and causes the bell crank 102 to swing on its pivot. As the bell crank swings, it moves the adjusting rod 31, by means of the pin 100 in the slot 101, toward its central or no stroke position.

The device therefore operates to reduce the stroke of the pump 22 and hence its discharge whenever the steering means are put in operation, and will so function, regardless of the position at which the control rod 110 is set. When the steering controls are returned to their neutral position, all parts of this stroke reducing mechanism will likewise return to the normal positions as determined by the setting of the control rod. By properly proportioning, the parts of this device may be made to reduce the stroke of the pump 22 any predetermined amount.

What I claim is:

1. A tractor having a plurality of tracks and hydraulic means for varying the relative speed of said tracks when said tractor is in motion comprising a motor for each of said tracks, separate means for transmitting power from each of said motors to its respective track, a pump, and passages for delivery and return of fluid between said pump and each of said motors, a plurality of valves in each of said passages controlling the flow of fluid between said pump and each of said respective motors, and means for actuating simultaneously the valves in each passage which are associated with the same motor.

2. A tractor having a plurality of tracks and hydraulic means for varying the relative speed of said tracks when said tractor is in motion comprising a motor for each of said tracks, separate means for transmitting power from each of said motors to its respective track, a pump, and passages for delivery and return of fluid between said pump and each of said motors, a plurality of valves in each of said passages, controlling the flow of fluid between said pump and each of said respective motors, means for actuating simultaneously the valves in each passage which are associated with the same motor, and unitary means for controlling said actuating means.

3. In an automotive vehicle propelled by a plurality of driven members, means for steering said vehicle by varying the relative speed of said members, including a single variable stroke hydraulic pump, a plurality of hydraulic motors, fluid passages intercommunicating between said pump and each of said motors, means for varying the relative amount of fluid delivered to said motors to control the relative speed of said members, and means actuated simultaneously with said last mentioned means to vary the length of stroke of said pump.

4. In an automotive vehicle propelled by a plurality of driven members, means for steering said vehicle by varying the relative speed of said members, including a single variable stroke hydraulic pump, a plurality of hydraulic motors, fluid passages intercommunicating between said pump and each of said motors, means for varying the relative amount of fluid delivered to said motors to control the relative speed of said members, and means actuated simultaneously with said last mentioned means to vary the length of stroke of said pump a predetermined amount.

5. In an automotive vehicle propelled by a plurality of driven members, means for steering said vehicle by varying the relative speed of said members, including a single variable output hydraulic pump, a plurality of hydraulic motors, fluid passages intercommunicating between said pump and each of said motors, means for varying the relative amount of fluid delivered to said motors to control the relative speed of said members, and means actuated simultaneously with said last mentioned means for varying the volume of fluid delivered by the pump.

6. A pressure fluid power transmission device comprising a source of pressure fluid, means for varying the quantity of pressure fluid delivered by said source, a plurality of fluid motors, a fluid circuit connecting said source with said motors, means for altering the relative speeds of said motors, and means actuated simultaneously with said motor speed altering means to actuate said quantity-varying means to vary the quantity of pressure fluid delivered by said source.

7. A pressure fluid power transmission device comprising a source of pressure fluid, means for varying the quantity of pressure fluid delivered by said source, a plurality of fluid motors, a fluid circuit connecting said source and said motors, means for altering the relative speeds of said motors, and means actuated simultaneously with said speed altering means to actuate said quantity-varying means to vary according to a predetermined ratio, the quantity of pressure fluid delivered by said source.

HUGO A. CENTERVALL.